ly Examiner—Carl E. Hall

United States Patent [19]
Hedel

[11] 4,315,358
[45] Feb. 16, 1982

[54] METHOD FOR THE MANUFACTURE OF CAPACITIVE PICKUP STYLI

[75] Inventor: Rudolph H. Hedel, West Windsor, N.J.

[73] Assignee: RCA Corporation, New York, N.Y.

[21] Appl. No.: 142,134

[22] Filed: Apr. 21, 1980

[51] Int. Cl.³ .............................................. H01G 4/06
[52] U.S. Cl. .................................. 29/25.42; 29/527.2; 204/192 SP; 369/126
[58] Field of Search ............... 369/126, 173; 29/25.42, 29/527.2; 204/192 SP, 192 R

[56] References Cited

U.S. PATENT DOCUMENTS

| | | | |
|---|---|---|---|
| 3,325,393 | 6/1967 | Darrow et al. | 204/192 SP |
| 3,826,877 | 7/1974 | Leedom et al. | 369/126 |
| 3,842,194 | 10/1974 | Clemens | 369/126 |
| 4,013,830 | 5/1977 | Pinch et al. | 204/192 SP |
| 4,052,738 | 10/1977 | Hosomi et al. | 369/126 |
| 4,273,967 | 6/1981 | Wada et al. | 369/126 |

FOREIGN PATENT DOCUMENTS 1505392  3/1978  United Kingdom .

*Primary Examiner*—Carl E. Hall
*Attorney, Agent, or Firm*—Birgit E. Morris; Edward J. Sites

[57] ABSTRACT

A method is provided for the manufacture of a capacitive pickup stylus. In the method of this invention an elongated stylus blank is prepared from a hard dielectric material such as diamond. The blank is formed into an elongated bar having substantially symmetrical diagonal cross-sectional halves along the length thereof and having opposing polished surfaces with one of the polished surfaces being on each of the diagonal cross-sectional halves. Thereafter, one of the cross-sectional halves is masked by a jig or the like and the other half which remains exposed is sputter coated with a conductive material. The coated stylus blank is then machined to provide a tip on a terminal end thereof with the coated polished surface positioned as the rearward electrode carrying surface of the stylus.

8 Claims, 11 Drawing Figures

METHOD FOR THE MANUFACTURE OF CAPACITIVE PICKUP STYLI

This invention relates to an improved method for the manufacture of capacitive pickup styli and more particularly is concerned with an improvement directed to the selective application of an electrically conductive layer on a predetermined surface of the styli.

BACKGROUND OF THE INVENTION

Capacitive recording systems have been developed which are capable of storing large volumes of electronic signal information on recorded disc which information can be regenerated by playback of the recorded disc on a capacitive record player. A capacitive playback and recording system utilizing recorded discs is disclosed in U.S. Pat. No. 3,842,194, issued to J. K. Clemens, entitled, "INFORMATION RECORDS AND RECORDING/PLAYBACK THEREFORE".

The stylus which is used in the playback of capacitive recorded disc of the type described above must be electrically conductive. Capacitive styli typically have elongated supporting shafts comprised of a relatively hard wearing material such as sapphire or more preferably diamond which are inherently dielectric in nature. The electrical conductivity required in the pickup stylus can be provided by forming an electrode on a surface of the stylus as disclosed in Clemens in FIG. 5, and as described at column 7, lines 34 to 63. The electrode is formed on the back side of the stylus. The supporting shaft is shaped at one end to a tip.

Defects in the stylus present substantial problems with regard to the playback performance of a recorded disc. The entire capacitive signal information from the playback of the recorded disc is picked up by the stylus. Any defect in the performance of the stylus and particularly in the electrical pickup characteristics of the stylus will cause an aberation of the desired electronic signal over the entire playback of the capacitively recorded disc.

The manufacture of capacitive pickup stylus having a consistent high quality of performance has proven to be a major manufacturing problem. The area in the manufacture of the stylus which has presented the most difficulty is the formation of the electrode on the back side of the stylus. In order to obtain performance of a high quality from a stylus it has been found necessary to form the electrode in a substantial uniform thickness on the stylus.

A method which has been suggested to provide an electrode on the stylus has been to tumble stylus blanks while sputtering them with a metal such as titanium. Such a procedure is disclosed in U.S. Pat. No. 3,325,393, issued to Darrow et al., entitled, "ELECTRICAL DISCHARGE CLEANING AND COATING PROCESS". The tumble sputter method has not proven to be satisfactory as the coating of the metal on the stylus blanks is not uniform. The stylus blanks, when tumbled together even in relatively small numbers, tend to clump together resulting in a random nonuniform application of the sputtered metal on the surfaces of the styli blanks. Certain of the surfaces of the stylus may receive excessively thick amounts of metallic coatings while other surfaces may remain virtually uncoated. Tumble sputtering coating further has a disadvantage that the physical contact of the metallized stylus blank in the tumbling process damages the metal coatings and even causes the styli to adhere to each other. A further problem of tumble sputtering is that all of the surfaces of the stylus blank are coated making it thereafter difficult to select the optimum orientation for micro-machining of the required tips onto the styli. A still further problem with tumble sputtering is that the yield of acceptable coated stylus blanks is inherently low, both due to the relative nonuniformity of the coating on the styli and also because of substantial breakage of the styli during the tumbling.

It would be highly advantageous if a method could be provided for applying electrically conductive coatings to stylus blanks which would be more uniform and in which a higher yield of acceptable styli was obtained. It would be especially advantageous if a method could be provided to selectively and uniformly coat only predetermined surfaces of the styli so as to facilitate further machining of the styli to obtain optimum performance from the finished styli.

SUMMARY OF THE INVENTION

An improved method for the manufacture of capacitive pickup styli is provided in which elongated stylus blanks are initially prepared from a hard crystalline dielectric material such as diamond. The stylus blanks are formed with at least a pair of opposing polished surfaces along the length of the stylus blanks. The stylus blanks are then placed in a jig having grooves which mate with the diagonal half cross-section of the stylus blanks. The stylus blanks placed in the grooves have one of the opposing polished surfaces of the stylus blanks exposed and the opposing polished surface of the blank masked. The stylus blanks in the grooves are then sputter coated on the exposed polished surface. The stylus blanks are then micro-machined so that the polished coated surface becomes the electrode on the back side of the finished styli and the uncoated polished surface becomes the face side of the styli.

DETAILED DESCRIPTION OF THE INVENTION

Figure 1:
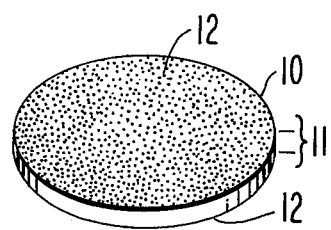
FIG. 1 is an isometric illustration of a wafer of a dielectric material.
Figure 2:
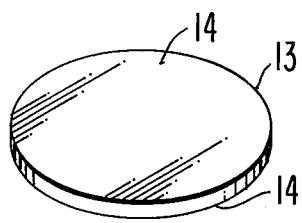
FIG. 2 is an isometric illustration of a wafer of FIG. 1 with opposing surfaces polished.
Figure 3:
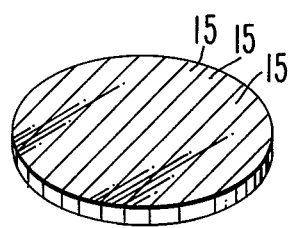
FIG. 3 is an isometric illustration of the polished wafer of FIG. 2 cut into elongated styli blanks.
Figure 4:
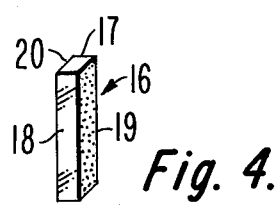
FIG. 4 is an isometric illustration of an individual stylus blank.
Figure 5:
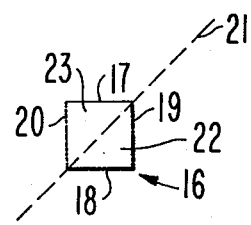
FIG. 5 is an end view of the stylus blank of FIG. 4.
Figure 6:
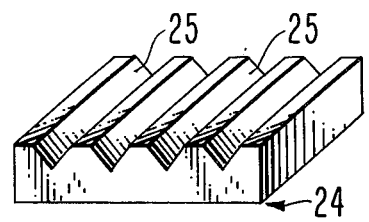
FIG. 6 is an isometric illustration of a jig for holding styli in accordance with the teachings of this invention.

In describing the preferred embodiments of this invention specific reference will be made to the manufacture of capacitive styli having a metallic electrode formed on a diamond support. It should be appreciated however that the support portion of the stylus can also be comprised of other dielectric materials such as sapphire and the like and the coating can be a conductive material other than the enumerated metals set forth hereinafter.

The initial step in the formation of the styli is the preparation of a wafer 10 of a hard dielectric material such as diamond. When diamond is employed typically the wafer 10 is obtained by sawing a natural diamond into a wafer of a uniform thickness 11. The wafer 10 as initially cut has relatively rough sawn surfaces 12. The sawn surfaces 12 are not suitable as the substrate surfaces for the application of the electrode coating as the coating would inherently conform to the sawn surface and would be therefore nonuniform in thickness.

Both of the surfaces 12 of the wafer 10 are polished to a high degree of smoothness to provide a polished wafer 13 with opposing polished surfaces 14. The polished wafer 13 is then sawn into parallelepipeds 15.

The individual parallelepipeds 15 are then cut to predetermined lengths to provide stylus blanks 16. As illustrated, each individual stylus blank 16 has a pair of opposing surfaces 17 and 18 which are polished and a pair of unpolished surfaces 19 and 20. An imaginary line 21 drawn diagonally through the end of a stylus blank 16 would show that the diagonal half cross-sections 22 and 23 are substantially identical in shape.

As illustrated, the stylus blank 16 has a square cross-sectional area. It should be appreciated, however, that in accordance with this invention the cross-sectional area of the stylus blank can be of other configurations, such as being rectangular with different widths and heights, a parallelogram or hexagonal in configuration. What is important for the purposes of this invention is that the diagonal cross-section halves be essentially symmetrical and that there be a pair of opposing polished surfaces.

The stylus blanks 16 are cleaned in preparation for sputtering by employing conventional well-known solvents and cleaning techniques.

Figure 7:
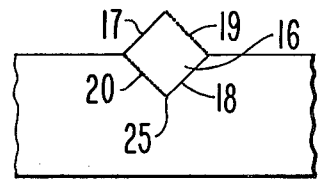
FIG. 7 is an illustration of a stylus blank positioned in one of the grooves of the jig of FIG. 6.
Figure 8:
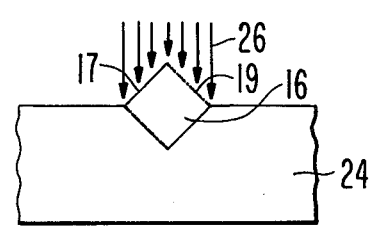
FIG. 8 is a schematic illustration of sputter coating of a stylus blank positioned in the jig of FIG. 6.
Figure 9:
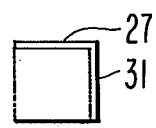
FIG. 9 is an end view of a coated stylus blank of this invention.

The stylus blanks 16 are then loaded into a jig 24 which has defined therein grooves 25 which mask one of the diagonal cross-sectional halves 22, 23 of each of the stylus blanks 16. The stylus blanks 16 can be placed into grooves 25 either by individually placing each one in a groove or they may also be positioned in the grooves by gradually vibrating a group of styli across the surface of the jig 24 until each stylus blank 16 falls into a groove 25. As placed in the jig 24, as illustrated in FIG. 7, one of the polished surfaces 17 of each stylus will be exposed and the opposite polished surface 18 will be masked by the jig 24. The jig 24 with stylus blanks in the grooves 25 is placed in an appropriate sputtering apparatus and an electrically conductive material, typically a metal, is sputtered onto the exposed polished surface 17 and the exposed unpolished surface 19 of the stylus blanks 16. Metals which may be sputtered onto the stylus blanks 16 include titanium, tantalum, chromium, tungsten, hafnium, zirconium, niobium and the like, with titanium being the preferred metal. In addition, it is also possible to reactive sputter other conductive materials such as metallic compounds onto the stylus blanks 16.

The electrically conductive material is applied to the stylus blanks 16 in the form of a uniform thickness coating by simply maintaining the sputtering conditions uniform over the exposed length of the stylus blanks. This is a relatively simple procedure well-known to those skilled in the sputtering art and can be readily accomplished as compared to attempting to obtain uniform coatings in tumble sputtering apparatus.

One end of the coated stylus blank is micro-machined in a number of separate steps to provide a tip 28 on the end of each stylus. In the micro-machining process it is important that the coated polished surface 27 of the stylus blank be oriented in the machining operation so as to be positioned to be in the correct position to become the electrode on the back side or the finished stylus. The polished uncoated surface 18 which was masked during the application of the electrically conductive coating can advantageously be utilized to orient the diamond stylus blank for further machining. By use of appropriate optical equipment the polished uncoated surface 20 can be differentiated from the polished coated surface 27 permitting relatively simple orientation of the diamond stylus blank for machining.

In the initial machining of the stylus blank a pair of facets 29 and 30 are cut onto the tip portion of the stylus blank. This initial machining of the stylus blank also cuts away the portion of the conductive material near the tip of the stylus which was previously coated on the rough unpolished surface 19 of the stylus. In this manner the rough cut plated surface 31 has the conductive material on its surface effectively insulated from the surface of the capacitive record disc in play and does not impart any undesirable affects on the electronic information pickup of the stylus.

The final micro-machining of the stylus provides a very narrow keel 32 on the stylus tip. It is this keel 32 which actually tracks in the grooves of the capacitive record.

Figure 10:
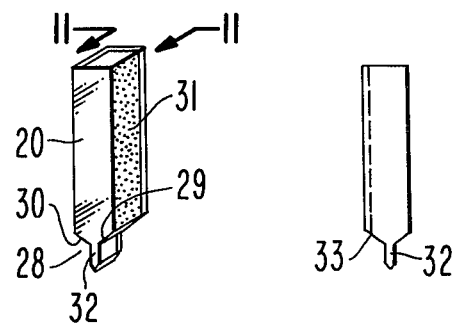
FIG. 10 is an isometric illustration of a typical tipped stylus.
Figure 11:
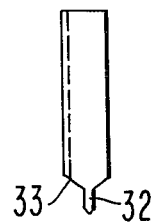
FIG. 11 is an illustration taken as indicated by the lines and arrows 11—11 on FIG. 10 of the electrode formed on the back side of the stylus illustrated in FIG. 10.

As seen in FIG. 11, taken as indicated by the lines and arrows 11—11 on FIG. 10 the coating of the conductive metal on the back side of the finished stylus extends down the back of the stylus to the tip of the keel 32. The coating on the rough surface 31 on the other hand however is terminated at a point 33 far above the keel 32 and does not pickup the signal from the record.

The manufacturing method of this invention provides substantial improvements in both the yield and the quality of the styli which are produced in comparison to the prior art technique of tumble sputtering the styli blanks. The electrical conductive coating on the back side of the styli of this invention is substantially more uniform and the thickness of the coating can be more readily controlled. In addition, the coated diamond stylus blank can thereafter be more easily oriented in subsequent machining operations so as to have the preferred smooth polished and coated surface as the electrode surface of the stylus. The yield of satisfactory styli is substantially improved as is the uniformity of the performance of the styli of this invention as compared to styli produced by the prior art method.

What is claimed is:

1. The method for the manufacture of a capacitive pickup stylus comprising the steps of:
   (a) providing a stylus blank of a dielectric material in the form of an elongated member having symmetrical diagonal cross-sectional halves along the length thereof and a pair of opposing polished faces with one face on each cross-sectional half;
   (b) masking one of the cross-sectional halves along its length;

(c) applying a layer of an electrically conductive material to the other cross-sectional half whereby the polished face on the unmasked half is coated with the electrically conductive material and the polished face on the masked half is left uncoated; and (d) machining a tip of a predetermined configuration on one of the terminal ends of the stylus blank with the electrically conductive material on the rearward surface of the stylus extending to the tip thereof and removing any conductive material deposited on other surfaces of the stylus blank in an amount sufficient to effectively insulate the conducting material on the other surfaces from the tip of said stylus.

2. The method according to claim 1 wherein the crystalline material is diamond.

3. The method according to claim 1 wherein the conductive material is a metal.

4. The method according to claim 3 wherein the conductive material is titanium.

5. The method according to claim 1 wherein the blank is in the form of a parallelepiped.

6. The method according to claim 5 wherein the parallelepiped has a square cross-sectional area.

7. The method according to claim 1 wherein the blank is masked by positioning said blank in a groove in a holding member wherein the groove has a cross-section mating the diagonal cross-sectional half of the blank.

8. The method for the manufacture of a capacitive pickup stylus comprising the steps of:

(a) cutting a diamond into a wafer having a predetermined thickness;

(b) polishing both of the major surfaces of the wafer;

(c) cutting the resulting polished wafer to provide a parallelepiped having a square cross-section and a pair of opposing polished faces along the length thereof;

(d) masking one of the diagonal cross-sectional halves of the parallelepiped;

(e) sputter coating the exposed half of parallelepiped with an electrically conductive material to provide a conductive layer on the exposed polished face on the parallelepiped;

(f) orienting the resulting coated parallelepiped with the coated polished face positioned to become the back side and the uncoated polished face the forward side of the finished stylus;

(g) machining a tip on a terminal end of the parallelepiped to provide a continuous layer of the conductive material on the back side of the stylus to the tip thereof; and (h) removing any conductive coating deposited on the other surfaces of the parallelepiped an insulating effective distance back from the tip of the stylus.

* * * * *